US007057130B2

(12) United States Patent
Gefter et al.

(10) Patent No.: US 7,057,130 B2
(45) Date of Patent: Jun. 6, 2006

(54) ION GENERATION METHOD AND APPARATUS

(75) Inventors: Peter Gefter, South San Francisco, CA (US); Scott Gehlke, Berkeley, CA (US)

(73) Assignee: Ion Systems, Inc., Alameda, CA (US)

( * ) Notice: Subject to any disclaimer, the term of this patent is extended or adjusted under 35 U.S.C. 154(b) by 0 days.

(21) Appl. No.: 10/821,773

(22) Filed: Apr. 8, 2004

(65) Prior Publication Data

US 2005/0236375 A1 Oct. 27, 2005

(51) Int. Cl.
*B23K 10/00* (2006.01)

(52) U.S. Cl. .......................... 219/121.36; 219/121.57; 219/121.52; 156/349.47; 361/232; 250/288

(58) Field of Classification Search ........... 219/121.36, 219/121.48, 121.4, 121.41, 121.43, 121.52, 219/121.54, 121.57; 156/345.43, 345.47; 204/298.31; 315/111.81; 250/288; 361/232
See application file for complete search history.

(56) References Cited

U.S. PATENT DOCUMENTS 5,630,949 A * 5/1997 Lakin .......................... 216/61
2002/0125423 A1* 9/2002 Ebeling et al. ............. 250/288
2003/0007307 A1* 1/2003 Lee et al. ................... 361/232
2004/0130271 A1* 7/2004 Sekoguchi et al. ...... 315/111.81

FOREIGN PATENT DOCUMENTS

JP 2000058290 8/1998
JP 10268895 * 2/2000

OTHER PUBLICATIONS

Partial translation of Japanese Patent Abstract 2000058290—published Feb. 25, 2000, application date Aug. 17, 1998 as application No. 10268895.
International Search Report and Written Opinion, PCT/US05/09093, Jul. 28, 2005.

* cited by examiner

*Primary Examiner*—Mark Paschall
(74) *Attorney, Agent, or Firm*—Fenwick & West LLP

(57) ABSTRACT

Method and apparatus for generating positive and negative ions include electrodes that are spaced apart by a gap and that are supplied alternating ionizing voltage at a frequency which causes the generated ions to move within the gap between electrodes and exhibit a resident time in transit that accumulates the ions substantially within the central region of the gap. An electrostatic field, or a flowing stream of air or other gas passing through the gap, transports the generated ions from within the gap. Self-balancing of generated positive and negative ions is accomplished using capacitive coupling of the ionizing voltage to at least one of the electrodes disposed about the gap.

23 Claims, 3 Drawing Sheets

ION GENERATION METHOD AND APPARATUS

FIELD OF INVENTION

The present invention relates to a method and apparatus for efficiently generating and harvesting ions capable of neutralizing an electrostatically charged target by generating self balancing ion clouds in corona discharge for harvesting the gas ions efficiently, and for providing easy movement of the ions to a charged object.

BACKGROUND OF THE INVENTION

Conventional static neutralizing systems based on air or other gas ionization in the vicinity of an electrostatically charged object are used to discharge conductive, semi conductive and electrically isolative objects. However, the efficiency of known static neutralizing systems is very low because about 95–99% of the generated ions cannot be harvested to discharge the charged object. This is because a corona discharge requires a high-intensity electrical field to generate ions, and the same field moves ions in the gap between the corona electrodes, preventing the majority of the ions from leaving the gap between corona electrodes. As a result, ion current flows mainly between the electrodes and the harvested ion output for charge neutralization is extremely low. This poor efficiency applies to conventional DC corona discharge devices and industrial or alternating frequency (50–60 Hz) corona neutralization systems. Additionally, known high frequency corona discharge neutralizing systems operating in the frequency range 0.1–10 MHz are characterized by very high ion recombination and big power losses created by stray capacitance of corona electrodes. It is desirable therefore to provide a method and apparatus of generating ions for static neutralization with high efficiency by optimization of the processes of generating, electrically balancing, and moving the generated ions.

SUMMARY OF THE INVENTION

In accordance with the present invention generation of positive and negative ions for static neutralization of a charged object is performed by gas or air ionization in a corona discharge. Bipolar corona discharge is performed in an ionization cell or module having electrodes connected to a generator of alternating ionizing voltage. Ideally, for the purpose of static neutralization, the corona discharge creates a bipolar ion cloud including a substantially equal mix of positive and negative ions. The cloud of ions continuously oscillates in the central region of a gap between the electrodes of the ionization cell. This oscillating ion cloud is concentrated within the central region of the gap by using specific combinations of amplitude and frequency of the alternating voltage applied to the ionizing cell, relative to the geometry and gap spacing between the electrodes and the mobility of gaseous ions in the cloud.

An ion cloud which oscillates in the central region of the gap promotes efficient harvesting of ions for neutralization of electrostatic charges on a nearby object. The charged object is positioned close to the ionization cell within a few multiples of the gap spacing to move the ions under the influence of an electrical field generated by the charged object itself. If the object is located at relatively large distances from the ionization cell, an additional transport mechanism such as gas or air flowing through the ionization cell can harvest ions from the gap for static neutralization of a charged object.

A cloud of generated ions oscillating between electrodes of an ionizing cell promote ion balance and mixing of negative and positive ions and efficient use of corona discharge current for easy transport of ions to a charged object for neutralization.

BRIEF DESCRIPTION OF THE DRAWINGS

FIG. 2*a* is a cross-sectional view of a corona electrode in FIG. 2;

DESCRIPTION OF THE INVENTION

Figure 1:
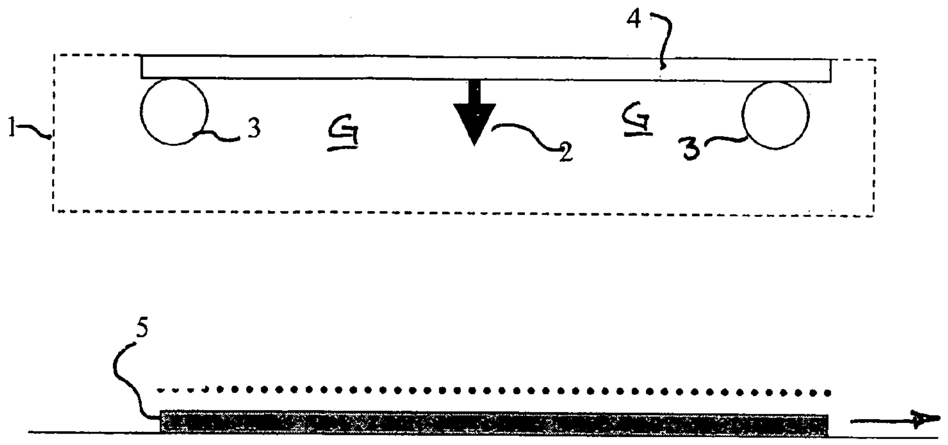
FIG. 1 is a pictorial cross sectional view of an ionization cell using one or more pointed ionizing electrodes.

Referring now to FIG. 1, there is shown a cross section of ionization cell 1 using one or more aligned ionizing pointed electrodes 2. In accordance with the present invention, a source of ions for static neutralization is provided by ionization cell 1 including electrodes 2 (named ionizing electrodes) having relatively small tip radius or a sharp point (or thin wire), and electrode 3 that can also be a sharp point (or thin wire), but preferably is circular of relatively large radius (named a counter or a reference electrode).

Ionization cell 1 includes a mechanical and electrically insulating support 4 for the corona electrodes to maintain a certain distance with a desired gap G between the electrodes. Ionizing and counter 2, 3 electrodes can be positioned substantially in one plain and preferably supported in plain-parallel relationship with an electrostatically charged surface of the object 5 requiring static neutralization. The charged object 5 can be stationary or moving (e.g. an insulative web of plastic, paper, cloth, or the like).

Figure 2:
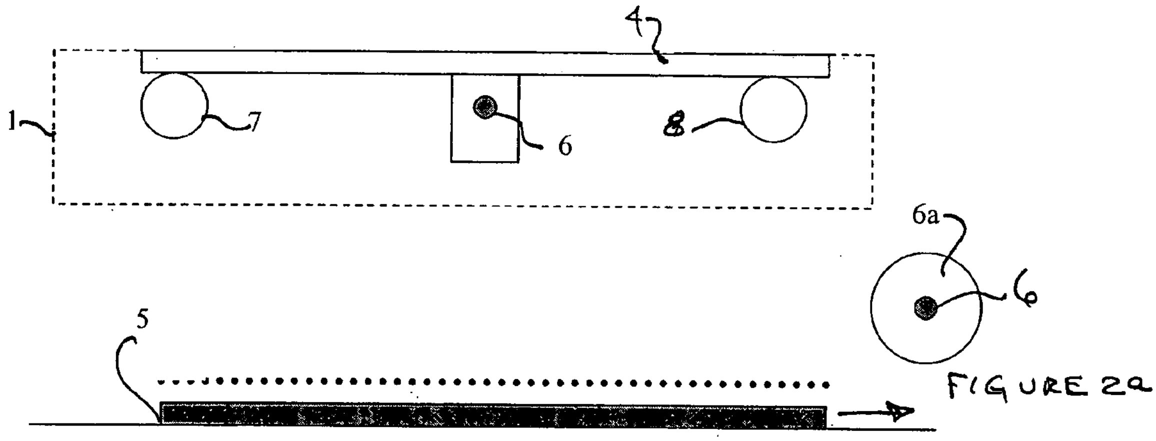
FIG. 2 is a pictorial cross sectional view of an ionization cell using an ionizing electrode in form of a thin corona wire.

Referring now to FIG. 2, there is shown a cross section of ionization cell 1 using ionizing electrode 6 in the form of a long thin wire. In this case, ionization cell 1 may comprise two counter electrodes 7 and 8 positioned to extend along or around the ionizing corona wire 6. The wire 6 may have a bare conductive surface, for example, metal surface or have a dielectric surface coating 6*a*, as shown in cross section in FIG. 2*a*. The counter electrodes 7, 8 also may have a bare conductive surface or a dielectric coating similar to the wire electrode shown in cross section in FIG. 2*a*.

Figure 3:
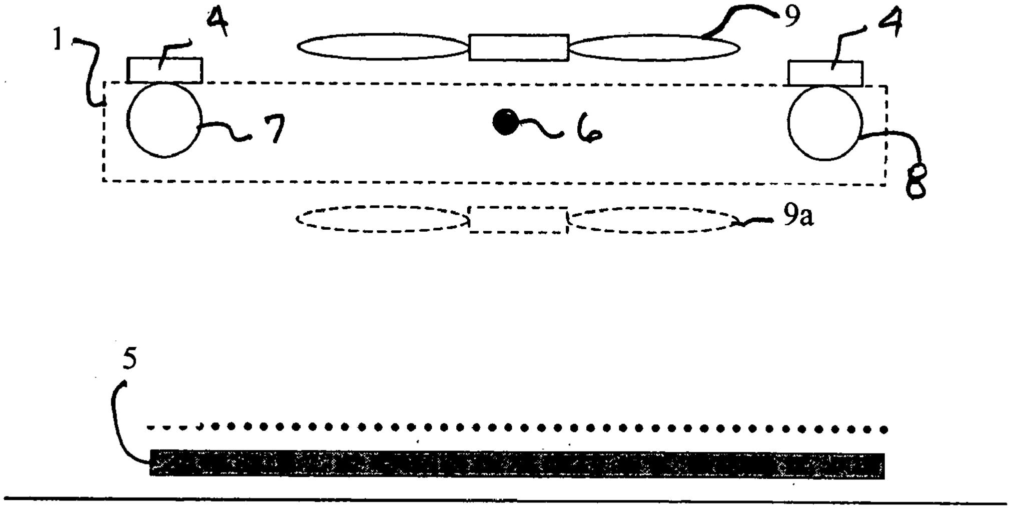
FIG. 3 is a pictorial cross sectional view of an ionization cell positioned in a vicinity of gas or air moving apparatus.

Referring now to FIG. 3, there is shown a cross section of an ionization cell which is positioned in a vicinity of gas or air-moving apparatus such as fan 9. This apparatus 9 may also be a jet nozzle, air duct, or the like. Ionization cell 1 can be aerodynamically configured to be transparent (e.g., via a duct through support 4) to the gas or air flow. In this case air moving apparatus 9 can be positioned downstream 9*a* or upstream 9 of ionization cell 1.

Figure 4:
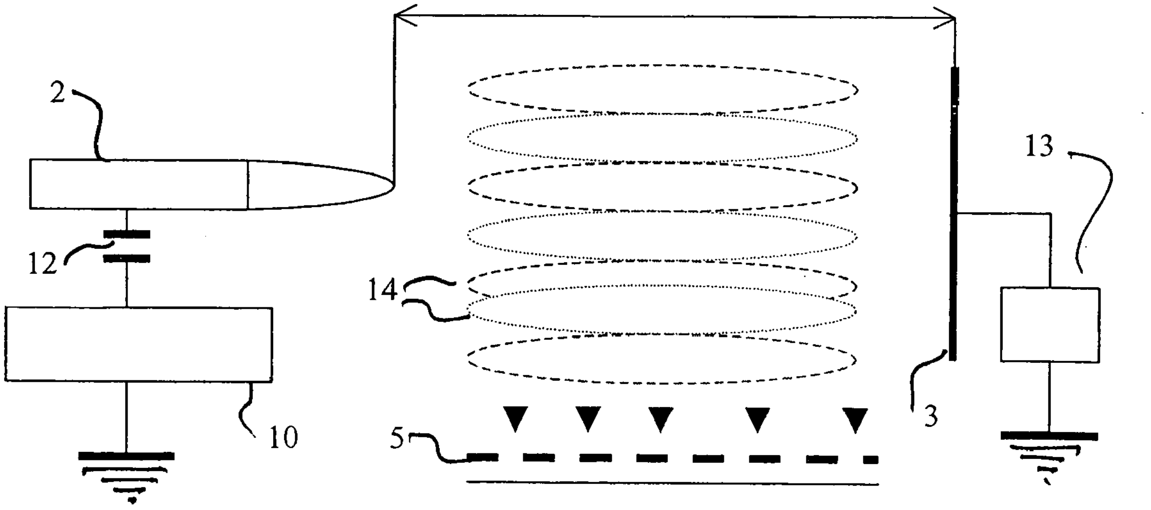
FIG. 4 is a block diagram showing an ionization cell connected to a source of alternating ionizing voltage.

Referring now to the block diagram of FIG. 4, there is shown an electrode 2 of an ionization cell connected to a source 10 of alternating ionizing voltage. This electrode 2, or group of aligned electrodes 2, of an ionization cell is connected to the source 10 of alternating high-voltage via capacitor 12, or alternatively by direct or resistive coupling. Preferably, the ionizing electrode 2 is capacitively connected

12 to the high voltage source 10, and the counter electrode 3 is connected to the ground directly or via a current monitoring circuit 13. Clouds 14 of positive and negative ions are thus caused to oscillate between electrodes 2 and 3 within the gap spacing G between these electrodes 2, 3 under the influence of the electric fields that are present.

Figure 5:
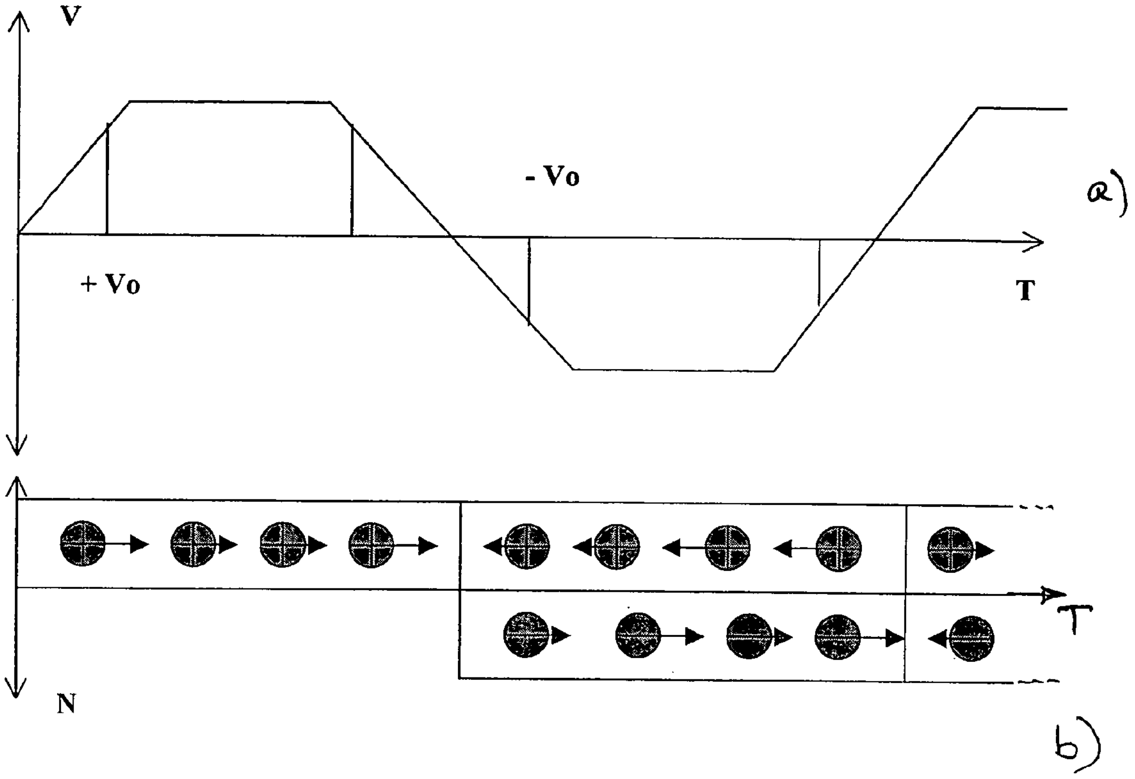
FIGS. 5*a*, 5*b* are plots illustrating voltage waveforms and ion clouds movements in an ionization cell.

Referring now to FIGS. 5*a, b*, there are shown charts or plots illustrating waveforms and ion cloud movement within the ionization cell formed between energized electrodes. FIG. 5*a* shows the high voltage V (t) vs. time (t) dependence with one cycle of a trapezoidal wave form, as an example, provided by high-voltage source 10. Of course, a sine wave, square or other periodic waveform of alternating voltage may be applied to the electrodes of the ionization cell 1. FIG. 5*b* shows, as an example, the movement of a gas of plus ions having a concentration (+) (N) and minus ions having concentration (−) (N) and forming ion clouds whose position over time depends upon the electric field created by the time-varying applied voltage.

As the voltage V (t) rises with time in the positive half cycle up to a threshold level Vo, a corona discharge of positive polarity will start. This threshold voltage Vo is known as the corona onset voltage and is a function of a number of parameters including the ionization cell geometry. During the period of time that the voltage between the electrodes is higher then Vo, the corona discharge generates an ion cloud having, for example, positive polarity. An electric field also will exist in the gap region due to the potential gradient between the electrodes, and the ion cloud will move in response to this electrical field away from ionizing electrode 2 (during positive polarity), and away from the counter electrode 3 (during negative polarity).

The speed of movement of the ion cloud is determined by the ion mobility μ, which is defined as the velocity of an ion per unit of electrical field intensity. Under most circumstances, the ion mobility can be considered to be relatively constant during the time that the ions traverse the gap between electrodes. The ion mobility, μ, is conveniently reported for most gases. The mean of ion mobility depends upon the polarity of the charge of ions, and varies with the molecular composition of the gas and physical parameters such as temperature and pressure.

In accordance with the present invention the desired voltage and frequency applied to the electrodes can be defined by the gap geometry of the corona electrodes 2, 3 of ionization cell 1 and the gas ion mobility.

The corona onset voltage, Vo, also depends upon the geometry of the ionizing electrode, the gas composition, physical parameters and the polarity of applied voltage. These onset voltages can be calculated or experimentally defined. To sustain a bipolar corona discharge, the amplitude of the time-varying alternating voltage V(t) applied to the electrodes of an ionization cell should be at least equal to or higher than the maximum corona onset voltage Vo. The ion drift velocity U (t) in the gap G between the ionizing and counter electrodes is given by:

$$U(t)=\mu E(t) \qquad \text{Eq. (1)}$$

where E (t) is the electric field over time and over the path traversed by the ion cloud in the electrode gap. For the purpose of simplified dimensional analyses to illustrate the application of this invention, E (t) can be approximated as V (t)/G, so that the drift velocity can be approximated as $$U(t)=\mu\times(V(t)/G) \qquad \text{Eq. (2)}$$

where μ is the average ion mobility for the cloud as described above and, for simplicity, may be taken as average ion mobility of positive and negative ions.

A typical value for μ for air at 1 atmosphere pressure and temperature of 21° C. is about $1.5\times10^{-4}$ [$m^2/V*s$]. In practice, numerical calculations can be used to more accurately describe both E and the statistical distribution of values for μ for a given ionizing cell and gas composition.

When applied voltage V drops to a level lower than the corona onset voltage Vo, the ion cloud will continue to move for a certain period of time under the influence of the resultant electric field, up to the time that that the applied voltage changes polarity. From this point in time further, the ion cloud starts drifting back toward the ionizing electrode 3. Eventually, the applied voltage reaches the negative ionization threshold, at which time negative ions are emitted. At this point, the positive ion cloud continues to drift toward the ionizing electrode and these ions both mix and recombine with emitted negative ions. As the negative half cycle continues, the negative ion cloud similarly moves away from ionizing electrode with drift velocity given by equation (1), as described above. The time needed for an ion cloud to travel out and back between the electrodes forming the gap is the residence time T of ions in the ionization cell. The residence time is also a statistical quantity that describes the lifetime of an ion from emission until removal either under the influence of an electric field of a charged object, or by gas flow, or by recombination and collision with an electrode.

The output of the corona discharge in the ionization cell can be optimized by providing positively and negatively charged ion clouds at a frequency of the alternating voltage matched to the residence time. This creates an ion cloud that oscillates predominantly in the central region between electrodes. Practically, that means that ion clouds created near the ionizing electrode can travel into the central region of the gap during period of the time T, where:

$$T=G/(2U(t))=G/(2\mu E(t)) \qquad \text{Eq. (3)}$$

this can be approximated using equation (2) by:

$$T=G^2/(2\mu V(t)) \qquad \text{Eq. (4)}$$

So, to fulfill the condition of ion clouds oscillating in the central region of the gap, the frequency of the applied ionizing voltage f to complete a full cycle should be:

$$f=½T=U(t)/G=(\mu V(t))/G^2 \qquad \text{Eq. (5)}$$

Equation (5) shows that to provide the maximum ionization cell efficiency with a higher applied voltage it is necessary to raise frequency. Also, it is well known that ion mobility is strongly dependent upon gas composition, temperature, and pressure. Therefore, under condition of higher ion mobility, the frequency of the applied voltage also should be increased. And, to avoid the necessity of using too high a frequency, the gap between electrodes also can be increased.

As an example, the average ion mobility in air at normal atmospheric condition is close to $\mu=1.5\times10^{-4}$ $m^2/V*s$, and the average corona onset voltage for a sharp point is about Vo=4000 V, so the applied voltage should be about V=6000V and the gap between electrodes of ionization cell may be $G=1.5\times10^{-2}$ m. Applying equation (5) gives the optimum frequency for the exemplary air-ionization cell in ambient pressure conditions as f=4 kHz.

For ion clouds oscillating in the central region of a gap between corona electrodes, ion losses attributable to migration toward an electrode of opposite polarity will be reduced. Moreover, such ion clouds do not have directed movement away from the ionizing electrical field but instead oscillate around the central region, so an electrostatic field of a charged object is able to readily harvest ions from the corona gap of the ionization cell to provide highly efficient static neutralization, and this can be accomplished with relatively low-intensity electrostatic field to move ions toward the charged object. In this manner, ion neutralization may discharge a charged object with very low level of residual charge positioned in close proximity to the gap.

In many cases, the charged object cannot be placed at a short distance from an ionization cell. To supply ions over longer distances from the ionization cell, the cell can be positioned in the vicinity of air or gas moving apparatus. Thus, an ionization cell can be positioned downstream or upstream from gas-moving apparatus such as a fan 9, 9$a$, and the ionization cell can be aerodynamically configured or made 'transparent' to air or gas flow. Thus, ion clouds oscillating in the central region of the gap between electrodes can be easily moved in an air or gas steam and supplied over a greater distance to the charged object. As a result, with relatively slow gas stream and small gas consumption, efficient charge neutralization can be achieved over large distances between an ionization cell and a charged object.

For alternating voltage applied to an ionization cell, capacitive coupling 12 can be used between high voltage source 10 and ionizing electrode 2. Conventional line-frequency sources (50–60 Hz) of high-voltage capacitively coupled to ionization electrodes with grounded counter electrodes are unable to provide electrically balanced ion flow, but instead commonly produce output ions with significant positive polarity offset attributable in part to disparate mobilities of positive and negative ions.

In contrast, ion clouds continuously oscillating in the central region between corona electrodes in accordance with the present invention and including a capacitive link to ionizing electrode 2 provides ion self balancing. Specifically, if for some reason, an extra number of ions of one polarity accumulated in the oscillating ion cloud, they will be deposited on the ionizing electrode to establish a bias-voltage offset via the capacitive coupling 12 that restores the ion balance in the cloud by altering the combined values of bias offset and time-varying high-frequency voltage needed to attain Vo. The counter electrode 3 can be grounded or connected to ground by current or voltage sensing circuit 13, as previously described.

Therefore, the method and apparatus of the present invention establishes an oscillating cloud of balanced positive and negative ions in the central region of an ionization cell from which the ions can be efficiently harvested and moved toward a charged object via low electrostatic field or flowing stream of air other gas.

What is claimed is:

1. A method for generating ions in a gas within a module including a pair of electrodes spaced apart across a gap disposed for passing a flowing gas therethrough, the method comprising the steps for:

applying alternating ionizing voltage to the electrodes for generating positive and negative ions within the gap between electrodes; and selecting the frequency of alternating ionizing voltage to establish the positive and negative ions substantially concentrated centrally within the gap.

2. A method for generating ions in a gas within a module including a pair of electrodes spaced apart across a gap, the method comprising the steps for:

applying alternating ionizing voltage to the electrodes for generating positive and negative ions within the gap between electrodes;

selecting the frequency of alternating ionizing voltage to establish the positive and negative ions substantially centrally within the gap; and selecting the amplitude of the ionizing voltage in consideration of mobility of the generated ions to establish the frequency of the ionizing voltage as:

$$\mu * V(t)/G^2$$

where μ is the ion mobility, V(t)) is the amplitude of the ionizing voltage, and G is the dimension of the gap between electrodes.

3. A method for generating ions in a gas within a module including a pair of electrodes spaced apart across a gap, the method comprising the steps for:

applying alternating ionizing voltage to the electrodes for generating positive and negative ions within the gap between electrodes;

selecting the frequency of alternating ionizing voltage to establish the positive and negative ions substantially centrally within the gap; and selecting the frequency of the ionizing voltage to establish residence time of the generated ions within the gap substantially as:

$$f = \tfrac{1}{2}T,$$

where f is frequency, and T is ion residence time.

4. The method according to claim 1 comprising:

selectively moving the generated ions from within the gap.

5. The method according to claim 4 comprising:

introducing flowing gas through the gap to transport generated ions from within the gap in the flowing gas.

6. The method according to claim 4 comprising:

moving the generated ions from within the gap in response to an electrostatic field of a charged object disposed in proximity to the gap.

7. The method according to claim 1 in which the alternating ionizing voltage is capacitively coupled to at least one of the pair of electrodes for self-balancing the generation of positive and negative ions within the gap.

8. The method according to claim 5 comprising passing the gas through the gap in substantially unimpeded flow.

9. The method according to claim 5 in which the gap is aerodynamically configured to pass the flowing gas therethrough substantially unimpeded.

10. Apparatus for generating a supply of positive and negative ions in a gas, the apparatus comprising:

a module including a pair of electrodes spaced apart across a gap of selected dimension and disposed to pass a flowing gas therethrough;

a source of alternating ionizing voltage coupled to the pair of electrodes for supplying time-varying voltage of alternating polarities thereto at a selected frequency for generating positive and negative ions substantially concentrated centrally within the gap.

11. Apparatus for generating a supply of positive and negative ions in a gas, the apparatus comprising:

a module including a pair of electrodes spaced apart across a gap of selected dimension;

a source of alternating ionizing voltage coupled to the pair of electrodes for supplying time-varying voltage of alternating polarities thereto at a selected frequency for generating positive and negative ions substantially concentrated centrally within the gap, the frequency being selected as:

$$\mu^*V(t)/G^2,$$

where $\mu$ is the ion mobility in the gas, V(t)) is the amplitude of the time-varying ionizing voltage, and G is the dimension of the gap.

12. Apparatus for generating a supply of positive and negative ions in a gas, the apparatus comprising:

a module including a pair of electrodes spaced apart across a gap of selected dimension;

a source of alternating ionizing voltage coupled to the pair of electrodes for supplying time-varying voltage of alternating polarities thereto at a selected frequency for generating positive and negative ions substantially concentrated centrally within the gap, the source supplying alternating ionizing voltage at a frequency to establish residence time of generated ions within the gap substantially as:

$$f=\frac{1}{2}T,$$

where f is frequency, and T is residence time.

13. Apparatus according to claim 10 comprising:

a source of flowing gas for transporting generated ions from within the gap.

14. Apparatus according to claim 13 in which the flowing gas is air;

and including a fan disposed relative to the gap for transporting generated ions from within the gap in a flowing stream of air.

15. Apparatus according to claim 10 in which the gap is disposed in proximity to a charged object for moving generated ions from within the gap in response to an electrostatic field of the charged object.

16. Apparatus according to claim 10 including capacitive coupling between the source of alternating ionizing voltage and at least one of the pair of electrodes for supplying time-varying voltage of alternating polarities to the electrodes for self-balancing the generation of positive and negative ions within the gap.

17. Apparatus according to claim 10 in which the gap is aerodynamically configured for passing flowing gas therethrough substantially unimpeded.

18. Apparatus for generating positive and negative ions comprising:

electrode means for forming a gap through which flowing air may pass; and, source means coupled to the electrode means for supplying thereto alternating ionizing voltage at a selected frequency for which generated ions are substantially concentrated centrally within the gap.

19. Apparatus for generating positive and negative ions comprising:

electrode means for forming a gap;

source means coupled to the electrode means for supplying thereto alternating ionizing voltage at a selected frequency for which generated ions are maintained substantially centrally within the gap, the frequency being selected as:

$$\mu^*V(t)/G^2,$$

where $\mu$ is ion mobility, V(t)) is the ionizing voltage, and G is the dimension of the gap.

20. Apparatus according to claim 18 in which the source means is capacitively coupled to the electrode means.

21. Apparatus according to claim 18 in which generated ions are selectively transported from within the gap.

22. Apparatus according to claim 21 in which the generated ions are transported in response to an electrostatic field disposed in proximity to the gap.

23. Apparatus according to claim 21 including means for flowing gas through the gap for transporting generated ions from within the gap in the flowing gas.

* * * * *